United States Patent [19]

Lim

[11] Patent Number: 5,285,267
[45] Date of Patent: Feb. 8, 1994

[54] CIRCUIT FOR COLOR SEPARATION AND CONTOUR CORRECTION

[75] Inventor: Jong-Gyun Lim, Suwon, Rep. of Korea

[73] Assignee: Samsung Electronics Co., Ltd., Rep. of Korea

[21] Appl. No.: 20,833

[22] Filed: Feb. 19, 1993

[30] Foreign Application Priority Data

Feb. 21, 1992 [KR] Rep. of Korea ............... 92-2761

[51] Int. Cl.$^5$ ............... H04N 9/78; H04N 9/77
[52] U.S. Cl. ............... 348/663; 348/713; 348/26; 348/253
[58] Field of Search ............... 358/31, 36, 39, 40, 358/37, 96, 162, 48; H04N 9/77, 9/78

[56] References Cited

U.S. PATENT DOCUMENTS

| | | | |
|---|---|---|---|
| 4,698,673 | 10/1987 | Johnson | 358/37 |
| 4,706,113 | 11/1987 | Ito | 358/37 |
| 4,843,457 | 6/1989 | Yamagata | 358/31 |
| 5,019,895 | 5/1991 | Yamamoto | 358/31 |

*Primary Examiner*—James J. Groody
*Assistant Examiner*—Sherrie Hsia
*Attorney, Agent, or Firm*—Sughrue, Mion, Zinn, Macpeak & Seas

[57] ABSTRACT

A circuit for a video camera for color separation and contour correction which can perform color separation and contour correction of a signal from a charge coupled device image sensor specifically utilizing two 1H (1 horizontal period) delay elements. The circuit adds a 2H delayed chrominance signal from a delay unit and a current input chrominance signal. This sum is then decreased by one-half. The circuit separates red and blue components of the chrominance signals decreased by half and from the 1H delayed chrominance signal from the delay unit. Next, vertical and horizontal contour correcting signals are generated in response to the 1H delayed chrominance signal from the delay unit and in response to the output of an amplifying unit. Thus, the present invention uses two 1H delay elements to perform color separation as well as contour correction to thereby simplify the overall circuit design.

6 Claims, 5 Drawing Sheets

FIG. 2

| G | Mg | G | Mg | G | Mg | · · · | ⎤ |
|---|----|---|----|---|----|-------|---|
| Cy | Ye | Cy | Ye | Cy | Ye | · · · | ⎦ 0H |
| Mg | G | Mg | G | Mg | G | · · · | ⎤ |
| Cy | Ye | Cy | Ye | Cy | Ye | · · · | ⎦ 1H |
| G | Mg | G | Mg | G | Mg | · · · | ⎤ |
| Cy | Ye | Cy | Ye | Cy | Ye | · · · | ⎦ 2H |
| · | · | · | · | · | · | · · · | |

FIG. 3

| 2G+B | 2R+B+G | 2G+B | 2R+B+G | · · · | — 0H |
|------|--------|------|--------|-------|------|
| R+2B+G | 2G+R | R+2B+G | 2G+R | · · · | — 1H |
| 2G+B | 2R+B+G | 2G+B | 2R+B+G | · · · | — 2H |
| · | · | · | · | | |

FIG. 4

| t₁ | 2G+B | 2R+B+G | 2G+B | 2R+B+G | ... |
|---|---|---|---|---|---|
| t₂ | R+2B+G | 2G+R | R+2B+G | 2G+R | ... |
| t₃ | 2G+B | 2R+B+G | 2G+B | 2R+B+G | ... |
| ⋮ | ⋮ | ⋮ | ⋮ | ⋮ | ⋮ |

FIG. 5

OUTPUT "a" OF IH DELAY MEANS 1

| t₁ | R+2B+G | 2G+R | R+2B+G | 2G+R | ... |
|---|---|---|---|---|---|
| t₂ | 2G+B | 2R+B+G | 2G+B | 2R+B+G | ... |
| t₃ | R+2B+G | 2G+R | R+2B+G | 2G+R | ... |
| ⋮ | ⋮ | ⋮ | ⋮ | ⋮ | ⋮ |

FIG. 6

OUTPUT "b" OF IH DELAY MEANS 2

| t₁ | 2G+B | 2R+B+G | 2G+B | 2R+B+G | ... |
|---|---|---|---|---|---|
| t₂ | R+2B+G | 2G+R | R+2B+G | 2G+R | ... |
| t₃ | 2G+B | 2R+B+G | 2G+B | 2R+B+G | ... |
| ⋮ | ⋮ | ⋮ | ⋮ | ⋮ | ⋮ |

| R+2B+G | R+2G | R+2B+G | R+2G | ... |
| R+2B+G | R+2G | R+2B+G | R+2G | ... |
| R+2B+G | R+2G | R+2B+G | R+2G | ... |
| : | : | : | : | : |

| B+2G | 2R+B+G | B+2G | 2R+B+G | ... |
| B+2G | 2R+B+G | B+2G | 2R+B+G | ... |
| B+2G | 2R+B+G | B+2G | 2R+B+G | ... |
| : | : | : | : | : |

FIG. 10
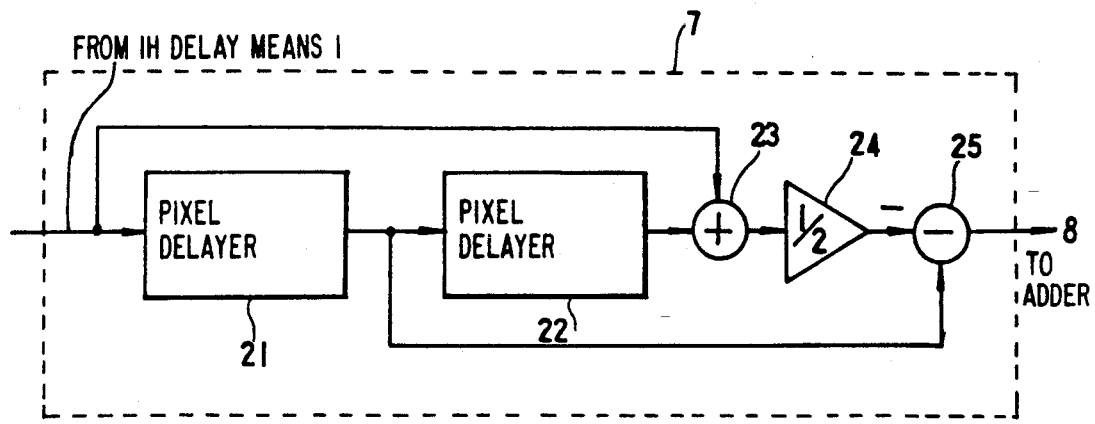
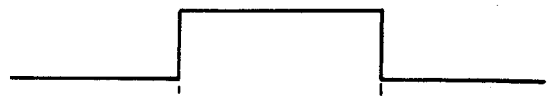
FIG. 11 A
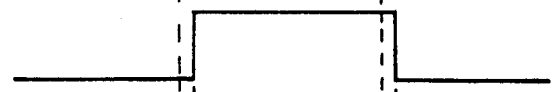
FIG. 11 B
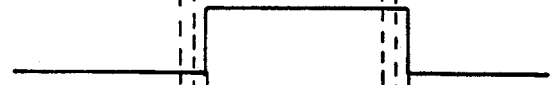
FIG. 11 C
FIG. 11 D
FIG. 11 E
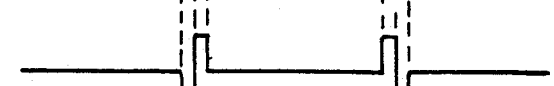
FIG. 11 F

CIRCUIT FOR COLOR SEPARATION AND CONTOUR CORRECTION

FIELD OF THE INVENTION

The present invention relates to a video camera, and more particularly to a circuit which uses two 1H (1 horizontal period) delay elements to perform color separation and contour correction of a signal output from a CCD (Charge Coupled Device) image.

BACKGROUND OF THE INVENTION

The conventional chrominance signal processing method is an analog processing method which uses two 1H delay elements for color separation and two 1H delay elements for contour correction. Thus, in order to perform color separation and contour correction, four delay elements were necessary, thereby complicating the circuit.

SUMMARY OF THE INVENTION

It is an object of the present invention to solve the above-mentioned problem by providing a circuit which can perform color separation and contour correction with two 1H delay elements.

To obtain the above noted objective, the present invention includes a circuit for color separation and contour correction, comprising delay means for outputting 1H-delayed and 2H delayed chrominance signals, first adding means for adding the 2H-delayed chrominance signal to a current non-delayed chrominance input signal and amplifying means for decreasing, by one-half, an output of the first adding means. The present circuit also includes chrominance signal separation means for separating red and blue components of the chrominance signals from the amplifying means and red and blue components of the chrominance signals from the 1H delay means. Contour correcting means is included to generate vertical and horizontal contour correcting signals in response to the 1H delayed chrominance signal and the output of the amplifying means. Second adding means is included to add the vertical and horizontal contour correcting signals outputted from the contour correcting means to the 1H delayed chrominance signal to thereby output a luminance signal having a corrected contour.

BRIEF DESCRIPTION OF THE DRAWINGS

For a better understanding of the invention, and to show how the same is achieved, reference is made to the accompanying drawings, in which:

FIG. 2 illustrates a conventional CCD image sensor;

FIG. 3 is a component drawing of an output signal from the CCD image sensor shown in FIG. 1;

FIGS. 4-8 are component drawings of each output signal from a circuit for the color separation and contour correction in accordance with the present invention;

FIG. 9 is a timing diagram of the color separating signal illustrated in FIG. 1;

FIG. 10 is a detailed constructional drawing of horizontal contour correcting means 7 illustrated in FIG. 1; and FIGS. 11A-11F are output timing diagrams for the circuit illustrated in FIG. 10.

DETAILED DESCRIPTION OF THE INVENTION

The present invention relates to a circuit for color separation and contour correction in a video digital camera which converts a chrominance signal from a CCD image sensor to a digital signal that is thereafter processed. The circuit for color separation and contour correction in accordance with the present invention is illustrated in FIG. 1.

Figure 1:
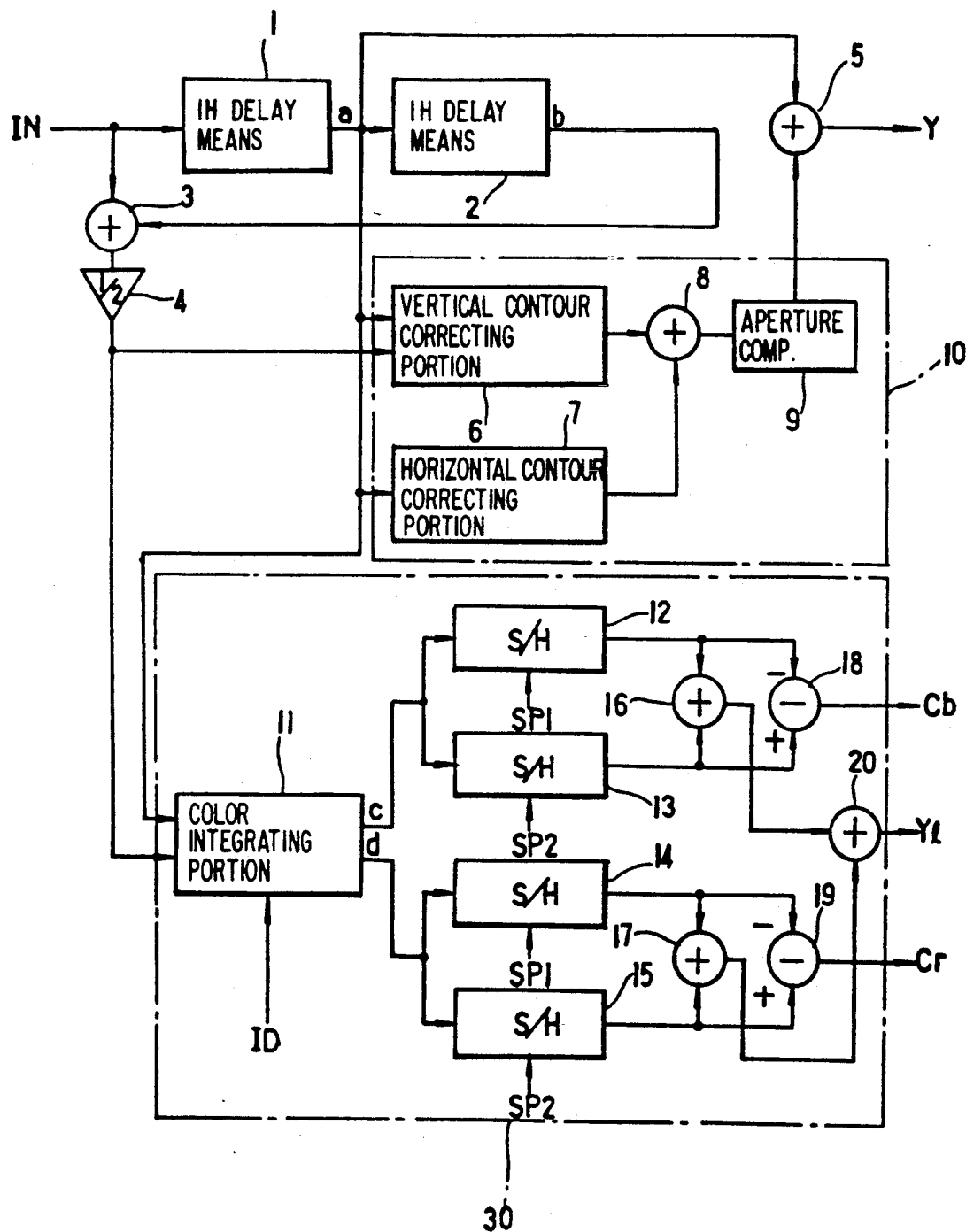
FIG. 1 is a circuit for color separation and contour correction in accordance with the present invention.

In FIG. 1, an input IN from the CCD image sensor is supplied to 1H delay means 1 and adding means 3. A color filter is attached to each pixel in the CCD image sensor, as illustrated in FIG. 2. As shown in FIG. 2, a first horizontal line has an alternating arrangement of G(Green) and Mg(Magenta) color filters. A second horizontal line has an alternating arrangement of Cy(Cyan) and Ye(Yellow) color filters. A third horizontal line has an alternating arrangement of Mg and G color filters, in an order opposite to that of the first horizontal line. A fourth line is identical to the second horizontal line. In the CCD image sensor, the above four line arrangement is repeated throughout the sensor.

The chrominance signals R(Red), G(Green) and B(Blue) are produced by adding corresponding pixels from 2 adjacent horizontal lines of the CCD image sensor. Specifically, pixels from the two horizontal rows, corresponding to the 0H delay (FIG. 2), form a chrominance signal by combining pixels in the order of G+Cy, Mg+Ye, G+Cy, Mg+Ye, etc., while pixels from the two horizontal rows, corresponding to the 1H delay, form chrominance signals by combining Mg+Cy, G+Ye, Mg+Cy, G+Ye, etc. This type of arrangement for producing chrominance signals is repeated for each subsequent four-line group.

Since Mg=R+B, Cy=G+B and Ye=R+G, the chrominance signals from the CCD image sensor are output with the arrangement as shown in FIG. 3, namely, the signal corresponding to the 0H delay alternately corresponds to the values 2G+B and 2R+B+G. Similarly, during the 1H delay, the chrominance signal alternately corresponds to the values R+2B+G and 2G+R, and during the 2H delay, the chrominance signal alternately outputs the values 2G+B and 2R+B+G (similar to the 0H delay). Accordingly, the chrominance signal, input to the 1H delay means 1 and the adding means 3 (FIG. 1) is shown in FIG. 3.

The chrominance signal as depicted in FIG. 3 is delayed for 1H period at the first 1H delay means 1. The chrominance signal from the first 1H delay means 1 is again delayed for 1H period at the second 1H delay means 2. Therefore, the first chrominance signal, corresponding to the 0H delay of FIG. 3, is output from the second 1H delay means 2, at the same time as the second chrominance signal, corresponding to the 1H delay of FIG. 3, is output from the first 1H delay means 1 and at the same time as the third chrominance signal, corresponding to the 2H delay, is input to the input terminal IN. When the first, second and third chrominance signals are viewed over time zones (i.e., t1, t2, t3....), the input IN, the output a of the 1H delay means 1 and the output b of the 2H delay means 2 can be separately illustrated in FIGS. 4, 5, and 6, respectively.

The adding means 3 adds an input chrominance signal at the terminal IN (FIG. 4) to a chrominance signal output from the second 1H delay means 2 (FIG. 6). Amplifying means 4 decreases, by one-half, a level of the summation chrominance signal output from the adding means 3. Accordingly, an output of the amplifying means 4 is just like the chrominance signal as illustrated in FIG. 4, which is identical to the signal of FIG. 6. This operation removes noise by adding two correlated pairs of horizontal lines and thereafter decrease the summation by one-half.

The first chrominance signal, after the noise is removed by the adding means 3 and the amplifying means 4, is supplied to contour correcting means 10 and chrominance signal separation means 30. The second chrominance signal (delayed for 1H period by the 1H delay means 1) is also supplied to the contour correcting means 10 and the chrominance signal separation means 30. The contour correcting means 10 generates horizontal and vertical contour correcting signals based on the first and second chrominance signals. Specifically, a vertical contour correcting portion 6 generates the vertical contour correcting signal based on the chrominance signal output from the amplifying means 4 and the chrominance signal output from the 1H delay means 1. A horizontal contour correcting portion 7 generates the horizontal contour correcting signal based only on the chrominance signal output from the 1H delay means 1.

The horizontal and vertical contour correcting signals generated from the horizontal contour correcting portion 6 and vertical contour correcting portion 7, respectively, are supplied to, and summed by, an adder 8. The output signal from the adder 8 represents a signal which includes the horizontal and vertical contour correcting signals. The details of the horizontal and vertical correcting portions 6 and 7 are described below in connection with FIGS. 10 and 11.

An aperture compressor 9 compresses and outputs the vertical and horizontal contour correcting signals from the adder 8. Further, the aperture compressor 9 adjusts and outputs a clip level and an output level in order to mix, as needed, contour correcting signals. The adding means 5 mixes and outputs the chrominance signal from the 1H delay means 1 and the contour correcting signal from the aperture compressor 9. The output of the adding means 5 is supplied to a luminance system and is thereafter processed.

Further, the outputs of the amplifying means 4 and the 1H delay means 1 are also supplied to a chrominance signal separation means 30 which generates a chrominance signal Cr corresponding to a red R light component, a chrominance signal Cb corresponding to a blue B light component and a luminance signal Yl. The chrominance signals input to the separation means 30 are illustrated in FIGS. 4 and 5. A detailed description of the separation means 30 is set forth hereafter.

The separation means 30 includes a color integrating portion 11, which integrates the input chrominance signals. Specifically, the integrating portion 11 receives the input chrominance signals and a pulse ID. The pulse ID alternatively outputs high and low levels during every horizontal period. When the pulse ID reaches a high level, the integrating portion 11 supplies the signal from the 1H delay means 1 to the sample/hold portions 12 and 13, and the signal from the amplifying means 4 to the sample/hold portions 14 and 15. Conversely, when the pulse ID attains a low level, the integrating portion 11 supplies the signal from the 1H delay means 1 to the sample/hold portions 14 and 15, and the signal from the amplifying means 4 to the sample/hold portions 12 and 13.

In the above manner, when the pulse ID is high, signals R+2B+G and 2G+R (as illustrated in FIG. 5) from the 1H delay means 1 at a time t1, are input to the sample/hold portions 12 and 13. Similarly, when the pulse ID is high, the signals 2G+B and 2R+B+G (as illustrated in FIG. 4) from the amplifying means 4 at time t1 are input to the sample/hold portions 14 and 15. Conversely, when the pulse ID is low, the signals 2G+B and 2R+B+G (illustrated in FIG. 5) from the 1H delay means 1 during the time t2 are input to the sample/hold portions 14 and 15. Also, during the low pulse ID, the signal R+2B+G and 2G+R (illustrated in FIG. 4) from the amplifying means 4 at time t2 are input to the sample/hold portion 12 and 13.

Figures 7, 8, 9:
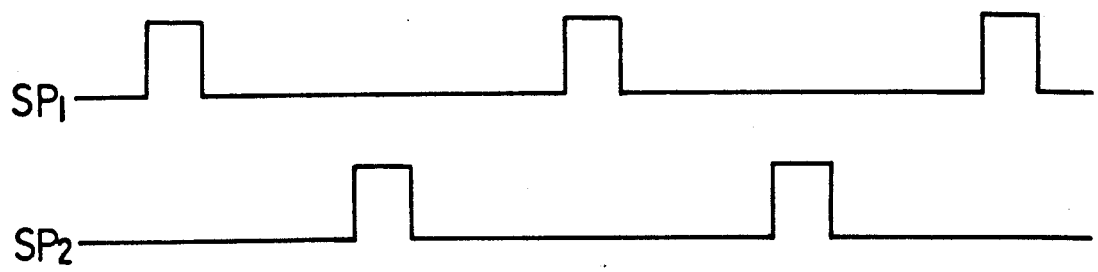

As seen from the foregoing, the integrated signals (on lines c and d) in the color integrating portion 11 are output, in response to the pulse ID, in the order R+2B+G, R+2G, R+2B+G, R+2G . . . and B+2G, 2R+B+G, B+2G, 2R+B+G . . . for every horizontal line (as shown in FIGS. 7 and 8) and are input to the sample/hold portions 12 and 13, and 14 and 15, respectively. The sample/hold signals (in FIGS. 7 and 8) on lines and are held by the sample/hold portions 12-15 based on sampling pulses SP1 and SP2, such that the same chrominance signals are continuously output. The above will be described below in more detail.

First, the chrominance signals R+2B+G and R+2G (FIG. 7) from the color integrating portion 11 are input through line c to the sample/hold portions 12 and 13, respectively. When the chrominance signal R+2B+G is input to the sample/hold portion 12, a sampling pulse SP1 (FIG. 9) is also input to the sample/hold portion 12. The sample hold portion 12 samples and holds the chrominance signal R+2B+G when the sampling pulse SP1 is input. The next sampling pulse SP1 causes the sample/hold portion 12 to hold the next chrominance signal R+2B+G. Thus, the sample/hold portion 12 continuously outputs the chrominance signal R+2B+G.

When the chrominance signal R+2G is input, the sampling pulse SP2 (FIG. 9) is input to another sample/hold portion 13, which receives the chrominance signals R+2B+G, R+2G, R+2B+G, R+2G...(FIG. 7) through line c. The sample/hold portion 13 samples and holds the chrominance signal R+2G input while the sampling pulse SP2 is high. Each subsequent sampling pulse SP2 is also input to the sample/hold portion 13 when the chrominance signal R+2G is input. Thus, the sample/hold portion 13 continuously outputs the chrominance signal R+2G.

Similarly, the chrominance signals B+2G, 2R+B+G, B+2G, 2R+B+G...(FIG. 8) through line d from the color integrating portion 11 are also input, respectively, to the sample/hold portions 14 and 15. The sampling pulse SP1 (FIG. 9) is input to the sample/hold portion 14 when the chrominance signal B+2G is input. The sample/hold portion 14 samples and holds the chrominance signal B+2G when the sampling pulse SP1 reaches a high level. The next sampling pulse SP1 is also input to the sample/hold portion 14 when the next chrominance signal B+2G is inputted. Thus, the sample/hold portion 14 continuously outputs the chrominance signal B+2G.

The sampling pulse SP2 (FIG. 9) is input to another sample/hold portion 15, which receives the chrominance signals B+2G, 2R+B+G, B+2G, 2R+B+G...(FIG. 8) through line d from the color integrating portion 11. The sample/hold portion 15 samples and holds the chrominance signal $2R+B+G$ when the sampling pulse SP2 is high. Each subsequent sampling pulse SP2 is input to the sample/hold portion 15 when the chrominance signal $2R+B+G$ is input. Thus, the sample/hold portion 13 continuously outputs the chrominance signal $2R+B+G$.

An adder 16 adds the chrominance signals $R+2B+G$ and $R+2G$ from the sample/hold portions 12 and 13 and outputs this sum. An adder 17 adds the chrominance signals $B+2G$ and $2R+B+G$ from the sample/hold portions 14 and 15 and output this sum. Furthermore, an adder 20 adds the summation chrominance signals from the adders 16 and 17 and outputs this sum as a signal Y1. In other words, the adder 20 outputs a signal combining the outputs of the sample/hold portions 12, 13, 14 and 15, namely, $Y1=(R+2B+G)+(R+2G)+(B+2G)+(2R+B+G)=3R+4B+5G$.

The luminance component is produced by adding each pixel's signal, and thus the signal from the adder 20 becomes the luminance signal. A subtracter 18 subtracts the signal $R+2B+G$ output by the sample/hold portion 12 from the signal $R+2G$ output by the sample/hold portion 13 and outputs a different chrominance signal Cb. A subtracter 19 subtracts the signal $B+2G$ output by the sample/hold portion 14 from the signal $2R+B+G$ output by the sample/hold portion 15 and outputs a different chrominance signal Cr. In other words, the chrominance signal separation means 30 separates and outputs the B component of the chrominance signal, $Cb=(R+2G)-(R+2B+G)=-(2B-G)$ the R component of the chrominance signal, $Cr=(2R+B+G)-(B+2G)=2R-G$ and the illuminance signal Y1.

FIG. 10 is a detailed drawing of the horizontal contour correcting means 7 illustrated in FIG. 1. The horizontal contour correcting means 7 comprises a first pixel delayer 21 for delaying, by 1 pixel, a chrominance signal from the 1H delay means 1, a second pixel delayer 22 for delaying, by 1 pixel, the output of the first pixel delayer 21 and an adder 23 which adds the chrominance signal that is delayed by 2-pixels and the chrominance signal from the 1H delayer 1. The correcting means 7 also includes an amplifier 24 for decreasing, by half, the output of the adder 23 and a subtracter 25 for subtracting the output of the amplifier 24 from the chrominance signal from the first pixel delayer 21.

The operation of the horizontal contour correcting means 7 (FIG. 10) will be described in more detail with reference to the timing drawings in FIGS. 11A, 11B, 11C, 11D, 11E and 11F. First, when a chrominance signal (FIG. 11A) is input to the horizontal contour correcting means 7, the pixel delayer 21 delays the chrominance signal by 1 pixel. The chrominance signal delayed by the pixel delayer 21 (FIG. 11B) is delayed once more by 1 pixel at the second pixel delayer 22. The output of the second pixel delayer 22 is illustrated in FIG. 11C. The adder 23 adds the chrominance signal from the second pixel delayer 22 (FIG. 11C) and the chrominance signal from the 1H delay means 1 (FIG. 11A). The output of the adder 23 is illustrated in FIG. 11D. The amplifier 24 decreases the output of the adder 23 by one-half to output a signal as shown in FIG. 11E. The subtracter 25 subtracts the output of the amplifier 24 from an output of the pixel delayer 21. Thus, the horizontal contour correcting signal is output from the subtracter 25 as shown in FIG. 11F. The horizontal contour correcting signal from the subtracter 25 is input to an adder 8 (FIG. 1).

The construction of the vertical contour correcting means 6 is similar to that of the horizontal contour correcting means 7, with the exception that the first and second pixel delayers are replaced by first and second 1H delay means, respectively. The first and second 1H delay means in the vertical contour correcting means 6 are similar to the 1H delay means 1 and 2 in FIG. 1.

As seen from the foregoing, the circuit for color separation and contour correction in accordance with the present invention utilizes two 1H delay elements (1 and 2) to perform color separation and contour correction, thereby simplifying the overall circuit. The foregoing description of the preferred embodiment has been presented for the purposes of illustration and description. It is not intended to limit the scope of this invention and in practice, many variations are possible without departing from the scope of the invention.

What is claimed is:

1. A circuit for color separation and contour correction, comprising:
   delay means for receiving and delaying an input chrominance signal and for outputting 1H delayed and 2H delayed chrominance signals delayed by one and two horizontal periods, respectively;
   first adding means for adding said 2H delayed chrominance signal to a non-delayed input chrominance signal;
   amplifying means for decreasing by one-half an output of said first adding means; and
   chrominance signal separation means for separating red and blue components of a chrominance signal output from said amplifying means and red and blue components of the 1H delayed chrominance signal output from said delay means, the chrominance signal output from said amplifying means and the 1H delayed chrominance signal output from said delay means being used to produce a contour corrected output signal.

2. A circuit for color separation and contour correction as defined in claim 1, further comprising:
   contour correcting means for generating vertical and horizontal contour correcting signals in response to the 1H delayed chrominance signal from the delay means and an output of the amplifying means; and
   second adding means for adding said vertical and horizontal contour correcting signals output from the contour correcting means to the 1H delayed chrominance signal to produce a contour corrected luminance signal.

3. A circuit for color separation and contour correction as defined in claim 1, wherein said chrominance signal separation means comprises:
   a color integrating portion for integrating, said chrominance signal output from the amplifying means and the 1H delayed chrominance signal from the delay means; and
   a sample/hold portion for sampling and holding a chrominance signal output from the color integrating portion.

4. A circuit for color separation and contour correction as defined in claim 3, wherein said chrominance signal separation means further comprises:
   a subtracter for extracting red and blue components of the chrominance signals in response to signals output from the sample/hold portion; and
   an adder for generating a luminance signal in response to signals output from the sample/hold portion.

5. A circuit for color separation and contour correction as defined in claim 2, wherein said contour correcting means comprises:
- a vertical contour correcting portion for generating said vertical contour correcting signal from said 1H delayed chrominance signal output from the delay means and said chrominance signal output from the amplifying means; and
- a horizontal contour correcting means for generating said horizontal contour correcting signal from the 1H delayed chrominance signal output from the delay means.

6. A circuit for color separation and contour correction as defined in claim 5, wherein said contour correcting means further comprises:
- an adder for adding the horizontal contour correcting signal from the horizontal contour correcting portion and the vertical contour correcting signal from the vertical contour correcting portion; and
- an aperture compressor for compressing the vertical and horizontal contour correcting signals from the adder.

* * * * *